United States Patent [19]

Gafos et al.

[11] Patent Number: 5,047,990
[45] Date of Patent: Sep. 10, 1991

[54] UNDERWATER ACOUSTIC DATA ACQUISITION SYSTEM

[75] Inventors: Adamandios G. Gafos, Baltimore; Donald Maxwell; Frank S. Halliwell, both of Annapolis; Dana C. Lynn, Severna Park; Christopher N. Sears, Shady Side, all of Md.

[73] Assignee: The United States of America as represented by the Secretary of the Navy, Washington, D.C.

[21] Appl. No.: 516,576

[22] Filed: Jun. 1, 1990

[51] Int. Cl.$^5$ ............................................. G01S 15/00
[52] U.S. Cl. ...................................... 367/6; 367/118; 367/907; 367/134
[58] Field of Search ................. 367/135, 118, 134, 13, 367/907, 6; 73/633, 634, 640, 641; 114/222; 901/1; 364/513, 507

[56] References Cited

U.S. PATENT DOCUMENTS

| | | | |
|---|---|---|---|
| 3,864,662 | 2/1975 | David et al. | 367/6 |
| 4,010,619 | 3/1977 | Hightower et al. | 405/191 |
| 4,176,338 | 11/1979 | Spindel et al. | 367/6 |
| 4,212,258 | 7/1980 | Collins | 114/312 |
| 4,648,345 | 3/1987 | Wham et al. | 114/338 |
| 4,721,055 | 1/1988 | Pado | 114/331 |
| 4,821,665 | 4/1989 | Matthias et al. | 114/222 |
| 4,832,532 | 5/1989 | Nagabhusan et al. | 405/185 |

OTHER PUBLICATIONS

"Operational Guidelines for ROVs", Marine Technology Society Subcommittee on ROVs, Jul. 1, 1984, pp. 83–94.
P. D. Rushfeldt, "Control System and Hydrodynamics Analysis for TUMS," Offshore Technology Conference, 14th Ann., May 3–6, 1982, pp. 595–598.
D. A. Yoerger & J. E. Slotine, "Nonlinear Trajectory Control of Autonomous Underwater Vehicles Using Sliding Methodology,", Oceans 84, vol. 2, Sep. 10–12, 1984, pp. 588–593.
D. A. Yoerger & J. B. Newman, "Demonstration of Closed-Loop Trajectory Control of an Underwater Vehicle," Oceans 85, vol. 2, Conf Nov. 12–14, 1985, pp. 1028–1033.
F. A. Geisel, "The SHARPs ® Telerobatic ROV Control System," Underwater Systems Design, Jan. 1989, pp. 11–15.

Primary Examiner—Daniel T. Pihulic
Attorney, Agent, or Firm—Luther A. Marsh; Sol Sheinbein

[57] ABSTRACT

An acoustic data acquisition system for shipboard use is disclosed that allows for underwater acoustic data measurements at preselected submerged marine structural coordinates using a free swimming, quiet dynamically positionable remotely operated vehicle (ROV). Moreover, the disclosure provides a method of performing acoustic data acquisition with an ROV by first inputting the marine structural features by use of a computer aided design subsystem, determining the required trajectory path and hovering coordinates for data measurements, next, establishing the acoustic telemetry system for the remotely operated vehicle's control system to operate within and make an absolute positional fix to the marine structure's coordinates then, establish the ambient acoustic conditions of the worksite. The system is monitored and controlled from a computer based system. The system includes an ROV subsystem that operates in conjunction with a computer based long baseline underwater telemetry and positioning control subsystem, an acoustic transducer array attached to the ROV and a real time data-coordinate storage subsystem. A particular type of transducer suitable for use with this vehicle is a passive acoustic transducer array (hydrophones) that measures low level sound pressures and phase data that provides a detailed description of the sound power field emitted over the surface of the marine structure. Applications include oil/gas pipeline leak detection and location of malfunctioning underwater marine equipment.

8 Claims, 4 Drawing Sheets

UNDERWATER ACOUSTIC DATA ACQUISITION SYSTEM

STATEMENT OF GOVERNMENT INTEREST

The invention described herein may be manufactured and used by or for the Government of the United States of America for governmental purposes without the payment of any royalties thereon or therefor.

FIELD OF THE INVENTION

The invention relates to an acoustic data acquisition system for shipboard use that allows for underwater acoustic data measurements at preselected submerged marine structural coordinates. More particularly, the invention pertains to an apparatus and method of making underwater acoustical measurements that incorporates a quiet, dynamically positionable free-swimming remotely operated vehicle (ROV) subsystem, a computer based long baseline underwater telemetry subsystem, a computer based positioning control subsystem, an acoustic transducer array, a solid modeling computer aided design (CAD) subsystem and a data storage subsystem.

BACKGROUND OF THE INVENTION

In many acoustic marine survey activities, it is necessary to physically inspect structures which are located beneath the surface of the sea. In the past, this work has depended primarily on placing a diver in the work location and providing life support at those ocean depths. Such operations are conditional upon weather and sea states for safe diving conditions. Examples of diver operations that use acoustic probes for acoustic surveys are illustrated by Collin's U.S. Pat. No. 4,212,258 entitled "Underwater Apparatus For Acoustically Inspecting a Submerged Object" and Nagabhusan et al.'s U.S. Pat. No. 4,832,532 entitled "Apparatus For Determining Liquid/Gas Interfaces". These teachings disclose the use of underwater ultrasonic acoustic apparatus for determining a marine structure's physical integrity and ascertaining the contents of an underwater tank structure for safe underwater work respectively.

To obviate the need for divers to perform surveys at inhospitable work sites, tethered remotely operated vehicles have become more widely used as shown by Hightower et al. in U.S. Pat. No. 4,010,619 and by Pado in U.S. Pat. No. 4,721,055. Such vehicles have incorporated power and signal means within a tether umbilical, multiplexed signal transmission means from the surface to the vehicle for command and control of the vehicle, television cameras, manipulator arms, a vehicle propulsion means, and a telemetry system to meet particular ROV system capabilities. Tools and acoustic sensors attached to ROV's is taught by "Operational Guidelines For ROVs" by the Marine Technology Society Subcommittee on ROVs, July 1, 1984, pp. 83–94.

Many underwater acoustic telemetry systems for determining the position of a submersible vehicle relative to an acoustic network, comprising multiple acoustic beacons in a long baseline configuration is well known in the art. For example, David et al.'s U.S. Pat. No. 3,864,662 entitled "Telemetry Systems Employing Active Transponders" teach of such a system that include a self calibration feature of the acoustic beacons once deployed. Another example, Spindel et al.'s U.S. Pat. No. 4,176,338 entitled "High Resolution Acoustic Navigation System" teaches of a system that use both a pulse and continuous wave acoustic beacon source, an auto-calibration feature to establish the relative coordinate beacon grid and provides high resolution positional data of the target.

For acoustic telemetry based position control of remotely operated vehicles, two approaches have been used, viz. a linear based control and a non-linear based control referred to as sliding-mode control. The linear based controller has been designed, tested and incorporated with the Towed Unmannned Submersible System (TUMS) built for the Royal Navy by Sperry Systems Management. To develop such a controller, extensive hydrodynamic analysis of the vehicle must be first performed to ascertain the vehicle's dynamic characteristics, see P. D. Rushfeldt, "Control System and Hydrodynamic Analysis For TUMS (Towed Unmanned Submersible)", Offshore Technology Conference, 14th Ann. OTC in Houston, Tex. May 3–6, 1982, pp. 595–598. The non-linear type controller in use referred to as sliding (suction) mode control is also effective for control of an underwater vehicle. This type of controller is highly adaptive to vehicle dynamic nonlinearities encountered in an underwater environment. This type of controller requires approximate hydrodynamic parameter characterization of the vehicle, see D. A. Yoerger and J. E. Slotine, "Nonlinear Trajectory Control of Autonomous Underwater Vehicles Using The Sliding Methodology", Oceans 84, Vol. 2, Conf. Wash. DC Sept. 10–12, 1984, pp. 588–593 and D. A. Yoerger and J. B. Newman, "Demonstration Of Closed-Loop Trajectory Control Of An Underwater Vehicle", Oceans 85, Vol. 2 Conf. San Diego, Calif. Nov. 12–14, 1985, pp. 1028–1033.

SUMMARY OF THE INVENTION

The present invention provides an acoustic data acquisition system for shipboard use that allows for underwater acoustic data measurements at preselected submerged marine structural coordinates. Moreover, the invention provides for a method of performing underwater acoustic data acquisition by first ascertaining the marine structures three dimensional body coordinates and storing them in a solid modeler CAD graphics package, then determining the required trajectory path and positional coordinates the ROV will follow and hover at relative to the marine structure under investigation, then overlaying an absolute coordinate system of the marine structure under investigation by establishing the acoustic telemetry beacons at known coordinates of the structure, then calibrating the acoustic transducer array as required relative to the background acoustic conditions of the worksite. The system is controlled from a computer based system. The invention includes a dynamically positionable, free-swimming and acoustically transparent ROV subsystem that operates in conjunction with a computer based long baseline underwater telemetry subsystem, an ROV positioning computer control subsystem, an acoustic transducer array, a solid modeling CAD graphics subsystem and a data storage subsystem.

It is the primary object of the present invention to provide a dynamically positionable, free swimming and acoustically transparent ROV that can perform acoustic data acquisition measurements at an underwater worksite.

It is another object of the present invention to provide an ROV with quiet propulsor means that allows for acoustic data measurements while not interfering with a marine structure's true acoustical condition under investigation.

Still another object of the present invention is to provide a method of performing underwater data measurements by automated means.

These and other objects of the invention will become more readily apparent in the ensuing specification when taken together with the drawings.

BRIEF DESCRIPTION OF THE DRAWINGS

FIG. 3 is a graph of spectral density of ocean noise with wind which is a standard by which underwater acoustics are referenced to.

DESCRIPTION OF THE PREFERRED EMBODIMENT

Figure 1A:
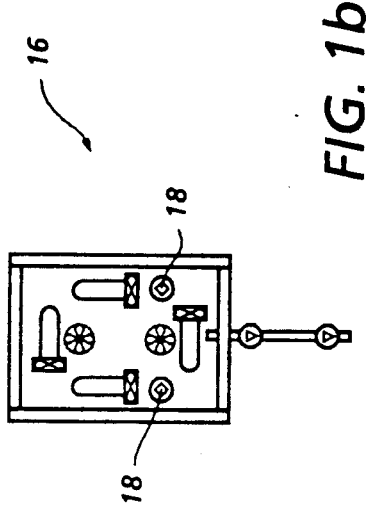
FIG. 1 is an elevational view of the underwater acoustic data acquisition system with the system deployed at dockside for investigation of a surface vessel.
Figure 1B:
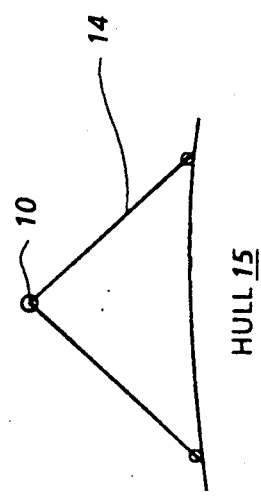
Figure 1:
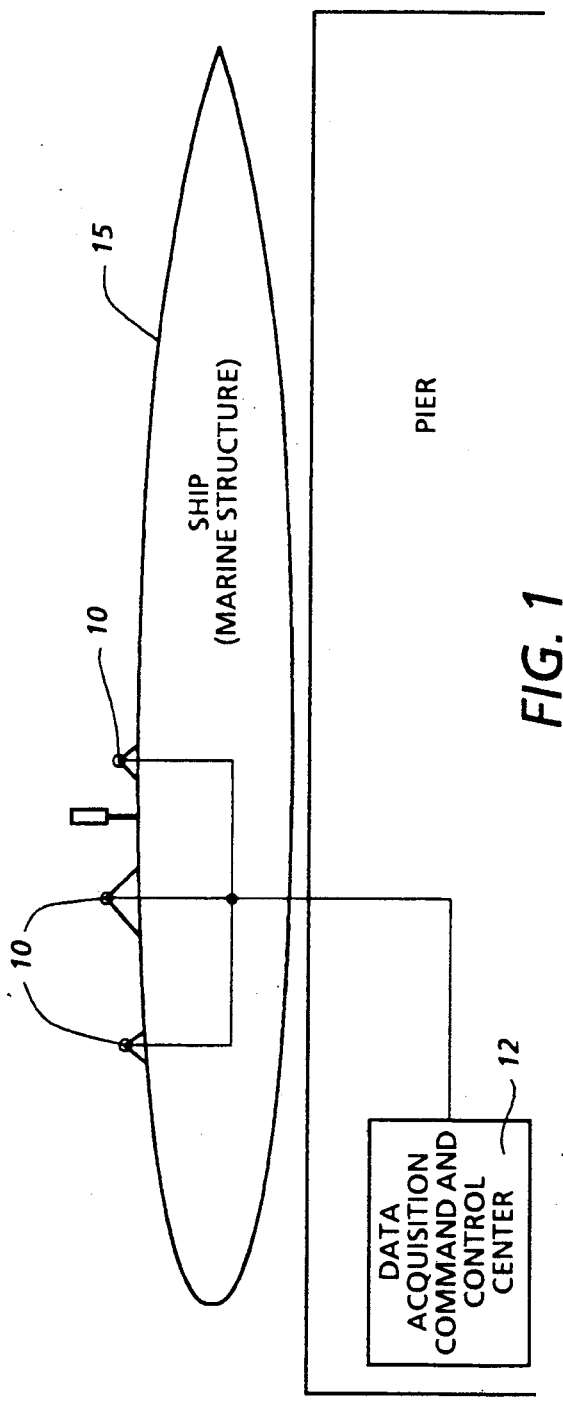

In FIG. 1, an elevational view of the underwater acoustical data acquisition system deployed at pierside. The system (10,12,14,16) is installed for the survey by placement of the telemetry subsystem's subsea acoustic beacons (10) that emit pulses of acoustic energy into the water at known or user controlled times. These boundary beacons (10) are positioned at known coordinates on the marine structure so as to establish an absolute grid by which acoustic data measurements are correlated. For illustration of the preferred embodiment, the surface ship (18) at pierside use telescoping poles (14) at which these beacons (10) are lowered to known underwater coordinates. The ROV (16) is deployed from the pier with it's own acoustic telemetry beacons (18) attached for vehicle positional control and acoustic data correlation. The data acquisition system command and control center (12) are installed at either pierside or on the ship (18) for setup of the system. The above operational scenario can be modified so that the marine structure at a deep ocean worksite such as a pipeline or offshore platform.

Figure 2:
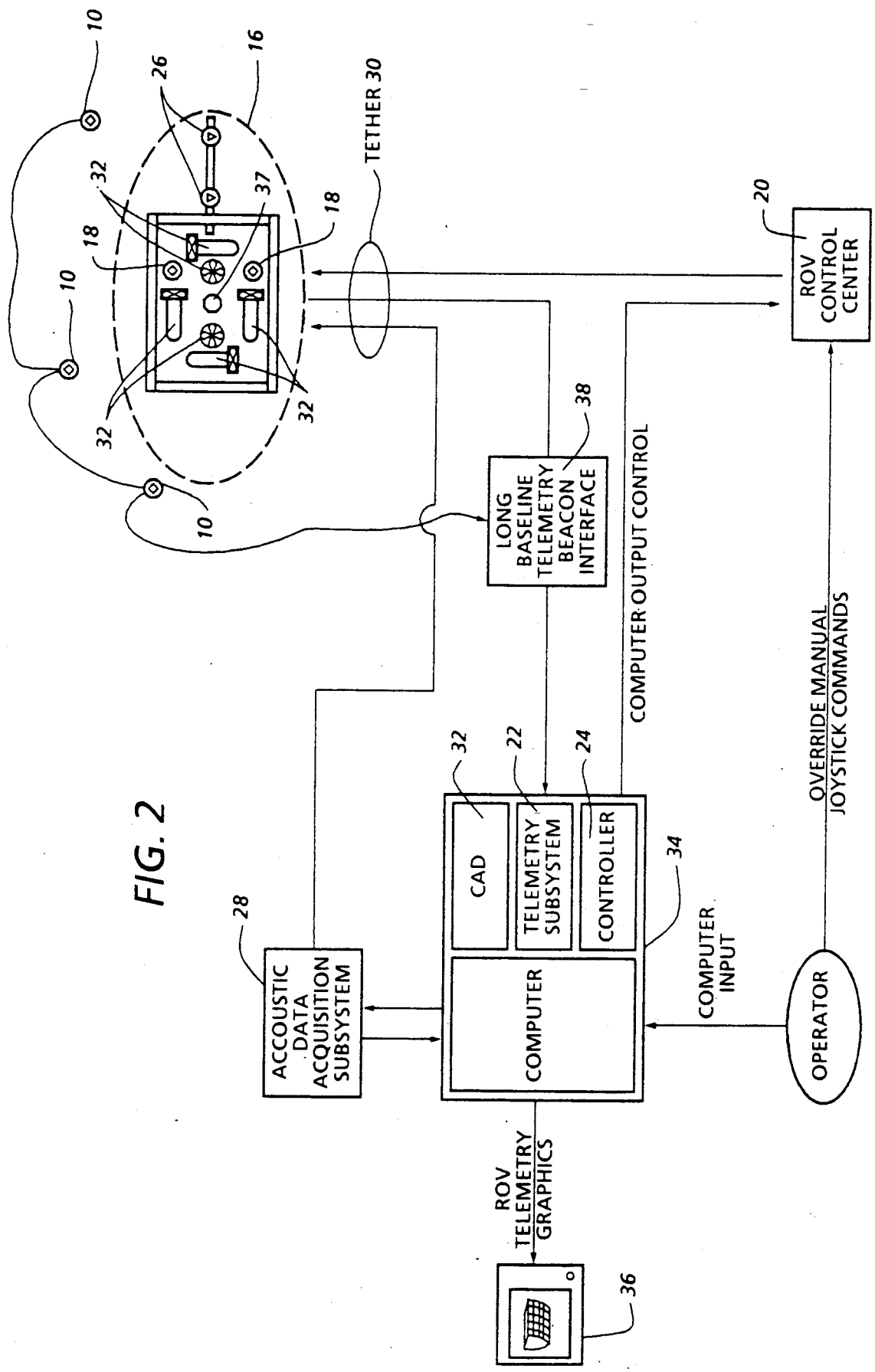
FIG. 2 is a diagrammatic view illustrating the major subsystems in accordance with the present invention.

In FIG. 2, the system is broken down into the major subcomponents of the ROV subsystem (16,20), the ROV's acoustic telemetry (22) and control subsystem (24), the acoustical transducer array (26), the CAD subsystem (32) and the data analysis and storage subsystem (28).

The ROV subsystem (16,20) of the present invention includes a tethered umbilical (30) conduit that provides the necessary electrical power and signals for command and control of the ROV (16), power and data signals from the ROV's telemetry acoustical beacons (18), and the power and data signals from the acoustical transducer array (26) located on the vehicle. The tether (30) can include power conductors to supply electrical power to the vehicle's thrusters (32) and include a fiber optic link in which signals are multiplexed and demultiplexed to reduce the number of signal wires in the tether. The tether (30) includes an armored element to provide mechanical tensile strength and has a neutrally buoyant outer jacket made of thermoplastic rubber or foam polyethylene to facilitate controllability of the ROV (16). The tether terminates at an underwater connector attached to the vehicle's main power and signal junction unit (37) on the vehicle. The ROV's command and control signals for maneuvering the vehicle are generated from the ROV'S control center (20) that control each of the ROV's thrusters (32) variable speed and direction so as to effect the desired vehicle motions. These signals are generated by either the system's control system (20) or by an individual operator using multiple joystick commands. The vehicle's (16) structural frame can be either a free-flooded or closed tubular construction that allows for ease of repair of components attached thereto. The vehicle is made stable and neutrally buoyant by attaching syntatic foam and lead weights as required. The ROV (16) incorporates several features desirable for inspection purposes that include a multi-axis motor actuated tilting instrument platform on which television cameras and an acoustical transducer array (26) are attached, a crash frame to surround the vehicle that protects vehicle components and thrusters from unexpected collisions, underwater quartz lights for viewing the worksite and underwater manipulator arms that assist in survey measurements.

The vehicle's (16) motion can be controlled in up to six degrees of motion viz. surge, sway, yaw, heave, pitch and roll. This requires a proper component layout on the ROV (16) for proper vehicle dynamic characteristics to satisfy requirements of the control subsystem (24). These include that ROV (16) be a stable underwater platform, i.e. the ROV has a stiff roll and pitch characteristic by having a large metacentric height. In other words, most of the weight of the components attached to the vehicle are as low as possible and all buoyant components are as high as possible on the vehicle's structure. Another requirement for proper and efficient operation of the ROV control subsystem (24) is that the center of force generated by any combination of thrusters (32) in operation coincide with the center of gravity so as to prevent cross coupling of vehicle dynamics. Also, any thruster pair along a common axes should operate in contrarotation to each other to prevent undesired moment generation when the pair operate. The thrusters (32) operation that allows for these vehicle motions includes a lateral pair, a vertical pair and a forward/reverse pair for x,y,z , pitch, roll and yaw motions. For a ROV with passive attitude stability, i.e. a vehicle which is very stable and exhibits a strong righting moment in roll and pitch motions, the thrusters would control the x,y,z and yaw motions.

The above described ROV (16) With umbilical tether (30) can be an autonomous underwater vehicle with the command and control center (12) as shown in FIG. 1 incorporated within the vehicle. Such a vehicle is shown in U.S. Pat. No. 4,648,345 entitled "Propeller System With Electronically Controlled Cyclic And Collective Blade Pitch" that uses a tandem propeller scheme. Such a vehicle can be tethered or autonomous in operation. This vehicle can generate six degrees of underwater motion with a pair of variable vector thrusters.

The ROV's computer with monitor system (34,36) comprised of control subsystem (24), telemetry subsystem (22) and CAD graphics subsystem (32) provide the interactive operations for monitoring and control of the system (10,12,14,16). The telemetry subsystem (22) provides the control subsystem (24) with absolute vehicle position and attitude feedback, and positional data of the acoustical array (26) to the data acquisition subsystem (28). Also the computer (34) operates the CAD graphics (28) input of the marine structure under investigation.

The telemetry subsystem (22) of the present invention is a long baseline system that provides the best ROV positional accuracy over wider areas of survey. This type of baseline system use three or more boundary acoustic beacons (10) and two or more target beacons (18) that are either a transponder or responder. A transponder is a transmitting/receiving unit which listens for a particular acoustic signal. Upon receipt of this signal it responds with an acoustic signal of its own which is received by the units on the ROV. A responder is similar to a transponder, but the interrogation signal is transmitted electrically. The effective operating range of such systems are on the order of 100 to 10000 meters dependent upon the frequency of acoustic transmission. The boundary beacons (10) are deployed at designated marine structural coordinates to establish the baseline grid and absolute coordinate system that the ROV operates from. At least three beacons (18) are attached to the ROV when six degrees of motion controllability are required. If a vehicle design incorporates passive attitude stability, two beacons (18) are required. The acoustic beacons emit high frequency broad band pulses of acoustic energy into the water at known or user-controlled times. The preferred frequency of transmission for the present system is above 200 kHz to obtain the required positional accuracy of the order of several centimeters and minimize adverse multipath tracking conditions. After propagating through the water, the telemetry subsystem (22) determines ROV position by measuring elapsed time and time differences of the beacon's hydroacoustic signals. Important to absolute positional accuracy is the speed of sound at the survey site. Using these times of travel, the subsystem (22) converts this information to slant ranges which are in turn converted to real world coordinates represented by x,y and z of the vehicle's center of gravity and attitude. The telemetry subsystem (22) is a computer based system with the capability of updating the ROV's position several times per second, has an interactive graphics interface between acoustic beacons (10,18) absolute location and CAD graphics subsystem (32). The telemetry subsystem's boundary acoustic beacons (10) also have the operational capability of self-calibration once deployed at the marine survey site that provides a relative beacon positional grid that are translated and superimposed with the established coordinate system of the marine structure by the CAD graphics subsystem (32).

The ROV control subsystem (24) is based upon the nonlinear based sliding mode control. This type of controller allows for parametric uncertainty of the ROV hydrodynamics, is tolerant to changes of ROV equipment payloads without adversely affecting vehicle controllability and saves much effort for the entire modeling and control system design cycle when building an ROV system. See D. A. Yoerger and J. B. Newman, "Demonstration Of Closed-Loop Trajectory Control Of An Underwater Vehicle", Oceans 85, Vol. 2 Conf. San Diego, Calif. Nov. 12-14, 1985, pp.1028-1033. For use of this technique, the ROV's (16) physical hydrodynamic drag characteristics in surge, heave, sway, pitch, roll and yaw; thruster force capability in these six motions; and yaw, pitch and roll rates are determined and used in the control subsystem. These parameters are determined in terms of effective mass. The bandwidth of ROV operation is also determined that varies in accordance with the ROV's design and variable payloads placed thereon. The variable forcing functions of the thrusters (32) operations for the various vehicle motions are also determined to form the basis of the command thrust that control subsystem (24) outputs to the thrusters through ROV control center (20).

The ROV control subsystem (24) comprises the input/output digital to analog boards that control required variable thrust capability of electric motor thrusters (32) on the ROV, the ROV control software based upon sliding control methodology, and a yaw, pitch and roll rate sensor located in the ROV's (16) instrument and power junction pressure canister. This subsystem's control software includes a control monitoring section for dynamic hovering of the ROV at a designated underwater coordinate, a go-to a series of an underwater coordinates and hold at those positions until prompted to go to the next position, an input section for values representing the vehicle hydrodynamic characteristics that affect vehicle control performance and a manual override capability where the control of the vehicle reverts to the operator via a manual control by use of a powered joystick that controls the thrusters directly through ROV control center (20).

The acoustic data acquisition subsystem (28) encompasses the acoustical transducer array (26) located on the on the ROV (16) and the accompanying data analyzer and computer storage system. Equipment for the acoustic transducer measurements include a shielded transmission means via tether (30) to a dynamic signal analyzer using a Fast Fourier Transform algorithm which analyze and digitize broadband frequency information for storage and retrieval via a data storage computer. Moreover, real time position coordinates are provided from telemetry subsystem (22) to data storage computer (28) for a permanent record of the marine structural survey.

One category of underwater acoustical transducer array (26) that can be used with the invention are active type units whose applications include non-destructive testing probes such as the flexible-two dimensional ultrasonic transducer array which can measure plate thickness as taught by U.S. Pat. No. 4,212,258 entitled "Underwater Apparatus For Acoustically Inspecting a Submerged Object" which is incorporated herein by reference. Other active transducers of the ultrasonsonic type include a unit shown by U.S. Pat. No. 4,832,532 entitled "Apparatus for Determining Liquid Gas Interfaces" which is also incorporated herein by reference, can be used in determining the condition of a submerged marine structure for safe underwater work.

Another category of underwater acoustical transducer that can be used on the ROV are passive type sensors that "listen only" to underwater sources. Such sensors include hydrophone arrays that measure underwater sound pressure levels and phase differences that assist in detection of underwater leaks in high pressure pipelines and can also monitor marine structure's internal equipment failures by analyzing the acoustic signature thereof. This type of sensor measures low frequency (less the 15 kHz) acoustic energy radiated from an underwater source. Such sensors include a phase matched line array of hydrophone elements spaced in such a manner as to measure low frequency sound fields emitted at low noise spectrum levels in vector and scalar quantities in the near acoustic field. For accurate measurements while operating, the hydrophone elements in the array must be phased matched, be of high sensitivity and measure a linear response in the frequency range of interest. Additionally, the ROV (16) must precisely position and orient the acoustic transducer array (26) during acoustic measurements. Low level sound measurements require that the acoustic signature of the thrusters (32) be nearly transparent.

Figure 3:
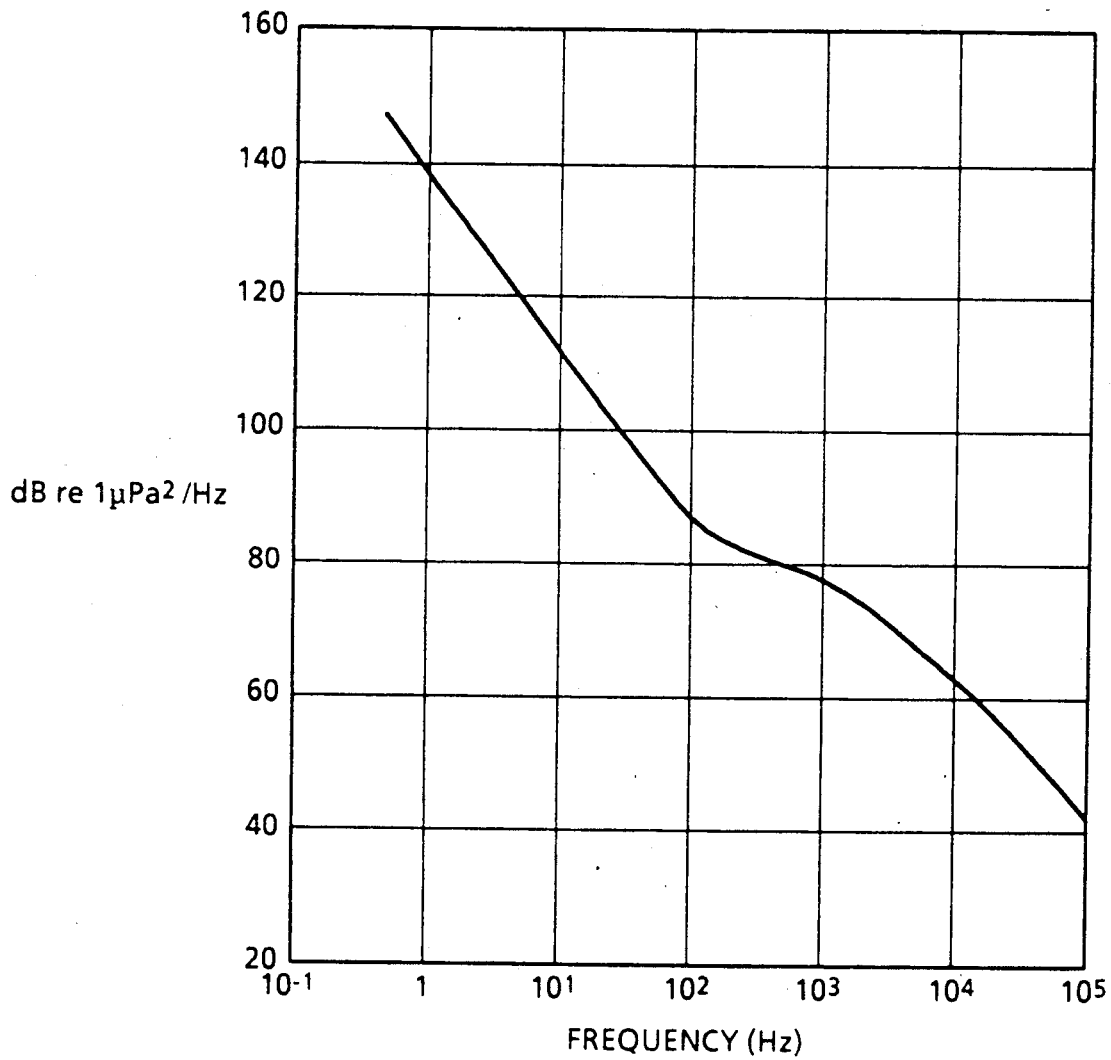

In FIG. 3, a graph of spectral density of ocean noise with wind conditions is given as a standard for noise level measurements. This standard is provided by Clay and Medwin's *Acoustical Oceanography Principles and Applications*, Wiley and Sons, copyright 1977, drawing 4.2.4, pg. 121. The invention requires the critical operational acoustical feature of being within a 10 decibel envelope above this ocean spectral noise levels relative to one micro-pascal pressure level in a frequency range below 15 kHz. To satisfy this and the control system requirement, each thruster must be a variable speed drive system with critical consideration given to the electronic controller/motor design and the thruster's propeller and shroud design. Each electric motor thruster (32) is controlled by a variable speed motor controller. The controller can be part of the control center (20) or be integral with the thruster (32). The thruster (32) can be housed in a pressure vessel with a rotary shaft seal or be pressure compensated. The type of electric motor thruster is either a dc brush motor or an ac type motor such as an induction, brushless dc motor or variable reluctance motor. The controller for any of these motors use solid state controllers that modulate power flow to the motor for variable speed or torque control from control center (20). The acoustic signature of these thrusters (32) are governed by bearing noise, fluid flow noise, motor vibration and electrical induced noise from the motor. Bearing noise can be minimized by use of sliding contact bearings. Fluid noise within a pressure compensated motors can be minimized by machining all internal rotating parts as smooth as possible. Motor vibrations are minimized by precision balancing of the rotor during fabrication. The electrical induced motor noise, which is the greatest source of noise, is caused by magnetostrictive forces which excites structural resonances within the motor. These electrical induced noises can be isolated into two components, viz. the motor per se and the motor controller. This motor noise can be minimized by conservatively designing the motor to operate at a flux density well below saturation, use heavy stiff motor framing to keep resonances at higher frequencies relative to the second and fourth harmonics of the exciting frequency and making the motor windings tight within the armature slots with their end windings interlaced to prevent chatter. The motor controller noise emanates from the controller's characteristic pulse width modulation (PWM) frequency which is used for variable speed controllability. Such controllers include variable voltage duty cycle control of dc motors and variable voltage/ frequency control for ac type motors. A controller's characteristic PWM radiates acoustically into the water ambient the fundamental PWM frequency and harmonics thereof. To provide an acoustic transparent window at frequencies less then 15 kHz for accurate data measurements, the controller's PWM frequency of operation must be higher then this frequency. To accomplish this, the frequency of a controller's PWM operation is in turn governed by the type of solid state power switching device used therein. For the invention, the required electrical power switching device use either a metal oxide surface field effect transistors (MOSFET) for a motor drive system of less then 5 kW with PWM frequencies greater then 25 kHz or insulated gate bipolar transistors (IGBT) for a motor drive system up to 10 kW power ratings with PWM frequencies up to 30 kHz. A device available soon includes MOS-controlled thyristers (MCT) which are projected to switch at these frequencies but have much higher power capabilities.

The propeller and shroud design of the present invention requires an elongated shroud design with the propeller within the central section of the shroud so as to control the fluid flow pattern away from the acoustic transducer array and attenuates noise emanating from the propeller while turning. The shroud has a special sound absorption material within the shroud such as the registered trademark material called Sorbothane, that attenuates sound pressure levels in the near field that in turn meets the vehicle's acoustic signature requirement while operating. Each propeller is of an odd number of blades with an associated even number of struts for supporting the shroud. The propeller is a fixed pitch propeller designed to operate at low speeds of around 300 RPM at maximum thrust capability.

MODE OF OPERATION

Figure 4:
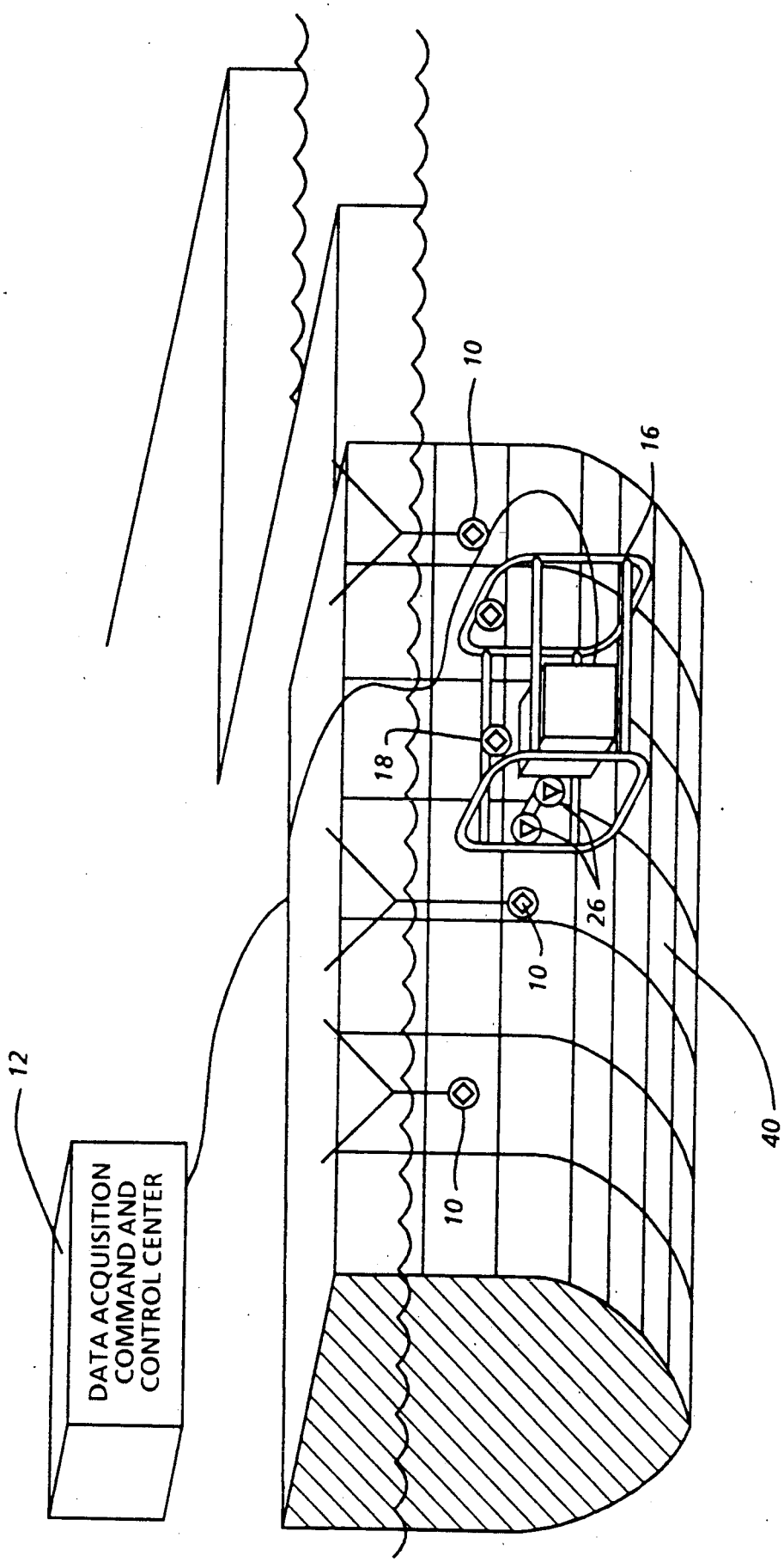
FIG. 4 is a diagrammatic view illustrating the method of performing acoustical data acquisition by CAD graphical mapping of the marine structural coordinates and establishing the known coordinates of the acoustical beacons.

FIG. 4 shows the method of operation where the ship (15) as shown in FIG. 1 has the system deployed along side the pier. The operator first takes the ship's or other marine structure's body plans as a source of dimensional information. References points from these plans are entered into a computer file using a solid modeling CAD software subsystem (32) which generate the locations of surface features (40). The telemetry system's boundary acoustic beacons (10) are placed with respect to the marine structure to give adequate telemetry coverage of the intended data survey areas. The placement of a minimum of three boundary beacons (10) should under best deployment conditions form an equilateral triangle for ROV positional determinations by the telemetry system (22). The beacons should never be placed in a straight linear orientation since a slant range positional determination cannot be obtained.

Once the beacons (10) are deployed, the telemetry subsystem acoustic net is calibrated and the relative coordinates are established. The computer (34) interfaces telemetry subsystems (22) graphics output subsystem with CAD subsystem's (32) graphics representation of the marine structure. The operator then adjusts the CAD subsystem's (32) relative coordinates to allign with telemetry subsystem's relative coordinates. This establishes an absolute coordinate system by which data measurements are referenced to the marine structure's coordinates.

The ROV (16) is deployed overside of the ship and the acoustic transducer array (26) goes through a calibration procedure to determine background pressure sound intensity levels for a baseline.

The computer control subsystem (24) is activated and assumes control of ROV (16) position and attitude towards the marine structure (15). Also, the acoustic data acquisition subsystem (28) is activated and monitors the marine structure (15) intermitantly when at the desired underwater coordinates. The ROV (16) may be directed through controller (24) to go to points of interests contained in a preplanned series of location points for the survey. Additionally, the system (24) allows for operator input mode for directing the vehicle to go to desired points of interests. If during the operation the operator directs the system to be by-passed to manual mode, the control system (24) is disabled and the operator assumes control through manual combinations of joystick commands to control the ROV's thrusters.

The foregoing description taken together with the appended claims constitutes the disclosure such as to enable a person skilled in the acoustic, electrical, marine and ocean engineering arts having the benefit of the teachings contained therein to make and use the unit of the invention, and, in general, constitutes a meritorious advance in the art unobvious to such a person not having the benefit of these teachings.

Accordingly, the invention having been described in its best embodiment and mode of operation, that which is desired to be claimed by Letters Patent is:

What is claimed is:

1. A method of making computer based underwater acoustic data measurements with a free swimming remotely operated vehicle comprising the steps of:
   a. ascertaining and mapping the three dimensional surface features of a marine structure with a solid modeler computer aided design means;
   b. deploying an underwater baseline acoustic net at said marine structure in accordance with said mapping of marine structure;
   c. deploying said remotely operated vehicle and performing background noise calibration with an underwater acoustic transducer array;
   d. performing a preplanned underwater acoustic data measurement survey of said marine structure; and
   e. performing analysis of said measurements and storing said information in a data storage system.

2. An apparatus for performing underwater acoustical data acquisition surveys of a marine structure which comprises:
   a free swimming remotely operated vehicle with a propulsor means that emits low sound pressure level acoustic energy in the near field that is no more than 10 decibels above an ocean with wind noise spectral density level relative to a one micropascal pressure level in a frequency range less than 15 KHZ;
   an underwater baseline acoustic telemetry means whereby said vehicle's underwater positional coordinates are obtained for both acoustic data correlation and for positional control of said vehicle;
   a control means for said vehicle whereby said vehicle will hover in relation to said marine structure, go to a given underwater coordinate in relation to said marine structure, traverse a preselected underwater trajectory in relation to said marine structure and control said vehicle's altitude towards said marine structure;
   a means for graphically inputting and displaying said marine structure under survey that correlates with said acoustic telemetry means whereby said surveys can be planned and monitored;
   an underwater acoustic transducer array unit attached to said vehicle that generates said acoustical data; and
   a means for analyzing and storing said acoustical data.

3. The apparatus of claim 2, wherein said control means use sliding mode control methodology.

4. The apparatus of claim 2, wherein said underwater acoustic transducer array comprises a passive acoustic transducer unit whereby low level sound pressure levels can be measured of underwater sources.

5. The apparatus of claim 2, wherein said underwater acoustic transducer array comprises an active acoustic transducer unit whereby ultrasonic measurements are made of said marine structure.

6. The apparatus of claim 2, wherein said free swimming remotely operated vehicle operates from a tethered umbilical.

7. The apparatus of claim 2, wherein said free swimming remotely operated vehicle is an autonomously operated vehicle.

8. The apparatus of claim 2, wherein said quiet propulsor means is a variable speed electric motor drive which drives a propeller wherein said motor drive system operates at a pulse width modulation frequency greater then 15 kHz.

* * * * *